UNITED STATES PATENT OFFICE.

JOHN HARRIS, OF LAKEWOOD, OHIO.

PROCESS OF WELDING.

1,303,892.

Specification of Letters Patent.

Patented May 20, 1919.

No Drawing.

Application filed May 17, 1918. Serial No. 235,173.

*To all whom it may concern:*

Be it known that I, JOHN HARRIS, a citizen of the United States, residing at Lakewood, in the county of Cuyahoga and State of Ohio, have invented a certain new and useful Improvement in Processes of Welding, of which the following is a full, clear, and exact description.

This invention relates to a process of welding metals with gases, and has for its general object to enable the operation to be accomplished in a particularly efficient and economical manner.

What is known in the art as the autogenous welding of metals such as steel, with blow pipes or torches, has hitherto been performed almost exclusively with acetylene, the acetylene being mingled with substantially pure oxygen for the purpose of producing a neutral or slightly reducing flame. However, the use of this gas is not only expensive, but the neutral flame is short and more or less blunt, whereby the tips are liable to destruction by the heat of the molten metal and, in the case of cutting, the slots are unnecessarily wide because of the melting of the sides of the same. Furthermore, the flame is liable to "flash back" within the tips because of the shortness of the cones and the relatively low igniting point of the gas, while the gas, at 200° C., begins to polymerize, producing an excess of carbon in the flame, and requiring for combustion of such carbon more oxygen than the pipe has been adjusted to supply.

It is the object of my invention to accomplish the autogeneous welding of such metals, and especially of steel, in and through the use, in a blow pipe or torch, of a gaseous mixture which is not only far more economical than acetylene—which has heretofore been employed to the practical exclusion of all other gases—but one which will prevent the production of a film of oxid of iron, thus enabling me to secure an ideal welding.

It has been attempted to employ hydrogen for the purpose of welding, but the use of the same has been found to be impracticable. It is extremely difficult to so adjust the hydrogen and oxygen as to produce a neutral flame which is sufficiently hot for welding purposes. When so adjusted, however, the products of combustion are water vapor which, striking the red hot iron in the presence of oxygen from the atmosphere, will be disassociated into hydrogen and oxygen, the oxygen producing a film of oxid upon the molten added metal and the hydrogen being consumed by the oxygen from the atmosphere. Furthermore, the combustion of hydrogen results in a colorless flame, so that it is extremely difficult to set the flame at the proper point with reference to the metal.

I am able to obviate the objections by mixing with hydrogen not less than about 10% and not more than about 20% by volume of acetylene. The combustion of this mixture with oxygen at the blow pipe tip will result in an inner cone of higher temperature than that secured by the combustion of hydrogen, and this cone will possess such a distinctive color as will enable the pipe conveniently to be set or adjusted with reference to the work as well as to secure a neutral flame or cone for welding purposes which cone is longer and is more pointed than one produced by acetylene alone, due to the fact that the igniting point of the mixture is higher than the igniting point of acetylene and to the fact that the temperature of the flame produced by the mixture is lower than the temperature of an acetylene flame. Furthermore, the acetylene constituent of the mixture having a lower ignition point than the hydrogen, the cone or flame employed for welding purposes will burn within and be protected from radiation by an envelop of hydrogen burning in the presence of some of the oxygen supplied from the pipe as well as in the presence of oxygen flowing in from the atmosphere. Furthermore, as is well known, the temperature of the acetylene, burning in the mixture of hydrogen and oxygen, is above that at which the hydrogen alone, or the hydrogen constituent of the acetylene, will combine with oxygen to form water; and the envelop of burning hydrogen prevents the reduction of this temperature through radiation to the point at which hydrogen will so combine with oxygen to form water. Hence no film of oxid can be produced upon the iron, provided that ordinary precautions are taken for producing the neutral flame, due to the combustion of the acetylene at the edges of the inner cone. I am, therefore, enabled to conveniently set the flame for welding purposes and to secure an extremely efficient weld. Furthermore, I am enabled to utilize for this purpose a gas containing as high as 90% of hydrogen and hence costing but little more than hydrogen alone, which has hitherto been found unsuitable for welding purposes.

In carrying out my process, the welding blow pipe or torch is supplied with a mixture of acetylene and hydrogen in about the proportions specified, a supply of substantially pure oxygen being mingled with the hydrogen and acetylene in the blow pipe or torch in the usual manner. The resultant flame consists of an inner pointed, clearly visible cone enveloped by a substantially colorless flame produced by hydrogen burning (but incompletely consumed) in the presence of some of the oxygen supplied from the pipe as well as in the presence of oxygen flowing into such envelop from the atmosphere. The visible cone thus produced is not only pointed, enabling it to accomplish the welding operation without unnecessary and wasteful heating of the steel, but is about twice as long as the rounded or blunted cone produced in a blow pipe employing the ordinary mixture of oxygen with acetylene.

By mixing hydrogen with acetylene in about the proportions set forth I am enabled to secure the following advantages:

(a) I am enabled to weld steel with a gas which is nearly as cheap as hydrogen, and the hydrogen constituent whereof has hitherto been allowed to escape as waste in plants where oxygen is manufactured by the electrolytic process or by the alkali process.

(b) I am enabled to weld with a gas having a hotter welding and preheating flame than hydrogen alone, resulting in a quicker welding and a quicker preheating operation than can be secured by hydrogen.

(c) I am enabled to weld with a gas which, over hydrogen, can be quickly adjusted to secure a neutral flame.

(d) I am enabled to weld with a gas which will produce a readily visible cutting and welding flame or cone the temperature whereof is higher than that produced by hydrogen and the igniting point whereof is higher than acetylene.

(e) I am enabled to secure the welding of metals such as steel without oxidation or carbonization of the weld.

(f) I am enabled to weld under conditions enabling the blow pipe tips to be employed with less liability of destruction, through close proximity to the molten metal, than is the case with acetylene.

(g) I am enabled to weld under conditions which will reduce to a minimum the danger of the flame flashing back into the tips, due to the fact that the igniting point of the gases employed is higher than acetylene and the neutral flame or cone is longer than that produced by acetylene.

(h) I am enabled to weld with the heating of a narrow zone of metal, and hence with a less consumption of gas and metal than is possible with the ordinary process, employing acetylene alone.

Ordinarily the acetylene will be mixed with the hydrogen in about the proportion of 10% by volume to the volume of the hydrogen. However, in the event that greater welding efficiency is desired, the proportion of acetylene can be increased to as high as approximately 20% of the volume of the hydrogen constituent of the mixture.

Having thus described my invention, what I claim is:—

1. The process of welding metals which consists in directing against the same a welding flame produced by the combustion of a mixture of hydrogen with acetylene in about the proportions specified, together with substantially pure oxygen.

2. The process of welding metals which consists in directing thereagainst a cone produced at the end of a blowpipe tip by the combustion of a mixture of hydrogen, substantially pure oxygen, and a gaseous fluid capable of imparting visibility to such cone, said fluid having a flame temperature higher than that of hydrogen and producing with the other gaseous constituents and the oxygen from the atmosphere a flame envelop for such cone that will protect the welded metal from oxidation.

3. The process of welding metals which consists in directing thereagainst a cone produced at the end of a blowpipe tip by the combustion in substantially pure oxygen of a mixture of hydrogen and a gaseous fluid capable of imparting visibility to such cone, having a flame temperature higher than that of hydrogen, and producing with the other gaseous constituents and the oxygen from the atmosphere a flame envelop for such cone that will protect the welded metal from oxidation, said fluid and the hydrogen being mingled in about the proportions specified.

In testimony whereof, I hereunto affix my signature.

JOHN HARRIS.